US010824146B2

(12) United States Patent
Rychtyckyj et al.

(10) Patent No.: US 10,824,146 B2
(45) Date of Patent: Nov. 3, 2020

(54) HANDLING RIDER SERVICE AT AUTONOMOUS VEHICLES

(71) Applicant: Ford Global Technologies, LLC, Dearborn, MI (US)

(72) Inventors: Nestor Rychtyckyj, Warren, MI (US); Hao Howard Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 16/023,874

(22) Filed: Jun. 29, 2018

(65) Prior Publication Data

US 2020/0004245 A1    Jan. 2, 2020

(51) Int. Cl.
| | |
|---|---|
| G05D 1/00 | (2006.01) |
| B60W 10/18 | (2012.01) |
| B60W 10/20 | (2006.01) |
| B60W 30/09 | (2012.01) |
| G05D 1/02 | (2020.01) |

(52) U.S. Cl.
CPC ........... *G05D 1/0088* (2013.01); *B60W 10/18* (2013.01); *B60W 10/20* (2013.01); *B60W 30/09* (2013.01); *G05D 1/0248* (2013.01); *G05D 1/0257* (2013.01); *G05D 2201/0212* (2013.01); *G05D 2201/0213* (2013.01)

(58) Field of Classification Search
CPC .............. G05D 1/0088; G05D 1/0248; G05D 2201/0213; G05D 2201/0212; G05D 1/0257; B60W 10/18; B60W 10/20; B60W 30/09; G06Q 10/02; G06Q 50/30
See application file for complete search history.

(56) References Cited

U.S. PATENT DOCUMENTS

| | | | | |
|---|---|---|---|---|
| 9,143,384 | B2* | 9/2015 | Yousefi | H04W 24/08 |
| 9,805,316 | B2* | 10/2017 | Nettleton | G06Q 10/0631 |
| 9,840,007 | B1* | 12/2017 | Kuffner | B25J 9/1671 |
| 9,984,572 | B1* | 5/2018 | Newman | G06Q 10/02 |

(Continued)

FOREIGN PATENT DOCUMENTS

| | | |
|---|---|---|
| DE | 102017004882 A1 | 12/2017 |
| DE | 202017106132 U1 | 12/2017 |
| GB | 2494047 A | 2/2013 |

*Primary Examiner* — Behrang Badii
*Assistant Examiner* — Jalal C Coduroglu
(74) *Attorney, Agent, or Firm* — Brandon Hicks; Eversheds Sutherland (US) LLP (57) ABSTRACT

The present disclosure extends to methods, systems, and computer program products for handling rider service at autonomous vehicles. Aspects of the disclosure use a task planning artificial intelligence (AI) framework to improve rider services provided at autonomous vehicles (AV). The AI framework uses tasking priorities and historical data-based machine learning to provide improved services, such as, passenger pickup, passenger drop off, etc. at an autonomous vehicle. A vehicle service is modeled as a Virtual Chauffer Agent (VCA) that acts independently and reacts in an environment to pursue delegated goals. The VCA can interoperate with a Virtual Driving System (VDS) to control an autonomous vehicle and transport a rider between locations. The VCA can interact with other agents (e.g., weather, traffic, map, etc.) to address rider service issues.

16 Claims, 3 Drawing Sheets

(56) References Cited

U.S. PATENT DOCUMENTS

| | | | | |
|---|---|---|---|---|
| 2002/0156556 | A1* | 10/2002 | Ruffner | G01S 5/02 701/23 |
| 2005/0251579 | A1* | 11/2005 | Ngo | G07C 5/085 709/234 |
| 2006/0276960 | A1* | 12/2006 | Adamczyk | G06Q 10/06 701/516 |
| 2014/0036076 | A1* | 2/2014 | Nerayoff | G06K 9/00791 348/148 |
| 2014/0306833 | A1* | 10/2014 | Ricci | G06F 16/951 340/901 |
| 2014/0309789 | A1* | 10/2014 | Ricci | G08B 25/016 700/276 |
| 2014/0309864 | A1* | 10/2014 | Ricci | A61B 5/4809 701/36 |
| 2015/0346727 | A1* | 12/2015 | Ramanujam | B62D 15/0285 701/23 |
| 2016/0042303 | A1* | 2/2016 | Medina | H04W 4/024 705/5 |
| 2016/0259341 | A1* | 9/2016 | High | B65F 3/00 |
| 2016/0364678 | A1* | 12/2016 | Cao | G06Q 50/30 |
| 2016/0364679 | A1* | 12/2016 | Cao | G06Q 50/30 |
| 2016/0364812 | A1* | 12/2016 | Cao | G06Q 50/30 |
| 2016/0364823 | A1* | 12/2016 | Cao | G06Q 50/30 |
| 2017/0075358 | A1* | 3/2017 | Zhang | G06Q 10/047 |
| 2017/0123422 | A1* | 5/2017 | Kentley | B60Q 3/00 |
| 2017/0123428 | A1* | 5/2017 | Levinson | G01S 13/86 |
| 2017/0126810 | A1* | 5/2017 | Kentley | G06Q 50/30 |
| 2017/0129335 | A1* | 5/2017 | Lu | G06F 19/324 |
| 2017/0132934 | A1* | 5/2017 | Kentley | G08G 1/202 |
| 2017/0220966 | A1* | 8/2017 | Wang | G06Q 10/0639 |
| 2017/0235940 | A1* | 8/2017 | McEwen | G06Q 10/02 726/19 |
| 2017/0236428 | A1* | 8/2017 | High | G06Q 50/30 701/120 |
| 2017/0242442 | A1* | 8/2017 | Minster | G06T 7/32 |
| 2017/0257450 | A1* | 9/2017 | Rao | H04L 67/22 |
| 2017/0345309 | A1* | 11/2017 | Bostick | B60W 30/16 |
| 2017/0357263 | A1* | 12/2017 | Glatfelter | G06K 9/0063 |
| 2018/0077778 | A1* | 3/2018 | Vangeel | H04W 48/20 |
| 2018/0174449 | A1* | 6/2018 | Nguyen | G08G 1/08 |

* cited by examiner

HANDLING RIDER SERVICE AT AUTONOMOUS VEHICLES

CROSS-REFERENCE TO RELATED APPLICATIONS

Not applicable.

BACKGROUND

1. Field of the Disclosure

This disclosure relates generally to the field of autonomous vehicles, and, more particularly, to handling rider service at autonomous vehicles.

2. Related Art

Various mechanisms are available allowing a person to request a ride either from a human operated vehicle or autonomous vehicle. A person desiring a ride can request a ride through a phone call, a mobile phone application, or a website. After a ride is scheduled and agreed, the rider goes to the pickup location and meets the vehicle. In the case of a human operated vehicle, a driver can address tasks/issues associated with a ride, such as, for example, an inaccessible pickup location, onboarding, intermediate stops, left behind belongings, offboarding, etc.

However, autonomous vehicles may have difficulties addressing these and other types of issues associated with a ride, especially when exceptions to standardized processes occur. When a rider's situation is not appropriately addressed, the rider can view an autonomous vehicle as unintelligent and not user friendly resulting in dissatisfaction with a ride. A dissatisfied rider can leave a bad review of a ride service and/or may choose a different ride service in the future.

BRIEF DESCRIPTION OF THE DRAWINGS

The specific features, aspects and advantages of the present disclosure will become better understood with regard to the following description and accompanying drawings where.

DETAILED DESCRIPTION

The present disclosure extends to methods, systems, and computer program products for handling rider service at autonomous vehicles.

Generally, aspects of the disclosure use a task planning artificial intelligence (AI) framework to improve rider services provided at autonomous vehicles (AV). The AI framework uses tasking priorities and historical data-based machine learning to provide improved services, such as, passenger pickup, passenger drop off, etc. at an autonomous vehicle.

An AV receives a stack of tasks, such as, for example, pick up, loading, authentication. The AV prioritizes and fulfils these tasks. The AI framework can be used, for example, whenever an AV is called for rider pickup. The AI detects the location of the vehicle and provides an alert to the user on the smartphone, whenever the vehicle has reached or is near the transfer zone. The AI is used to alert the user that the vehicle has arrived for pick up on the user device.

Numerous unforeseen situations can arise in a ride scenario. For example, the pickup location may not be accessible due to traffic jam or weather hazard or inconvenience, the passenger may need to retrieve something that she/he forgot to bring, passenger medical conditions can cause the ride to divert to a different destination, the passenger might realize she/he left personal belongings in the car after off-boarding the vehicle, and so forth.

Some approaches build a "decision tree" to model the ride process. These approaches start with a "happy path", an ideal process from the beginning to the end of the ride. Possible exception cases are studied and branches of sub-process are built to address these exception cases. As more and more exception cases are considered, the decision tree becomes bigger and bigger and more and more complicated to manage. At a certain stage, further expansion of the decision tree is not practical and treatment of additional exception cases has to be simplified. As a result, riders can view services provided using these approaches as unintelligent or not user friendly.

Accordingly, aspects of the disclosure utilize an agent architecture. An agent is a computer system that can act independently in an environment and react in the environment to pursue delegated goals. A vehicle service can be modeled as a Virtual Chauffer Agent (VCA). The VCA can interoperate with a Virtual Driving System (VDS) to control a vehicle and transport a rider between locations. The VCA can also address rider service issues.

The VCA can interact with other agents to address rider service issues. For example, the VCA interact with a Weather Agent when it needs to find weather information, a Traffic Agent when it needs to find traffic information, etc. The VCA can also interact with an AV operation center (e.g., a Transportation as a Service (TaaS) Center) to receive specific orders. The VCA can include defined interfaces for interaction with other agents and systems.

Figure 1:
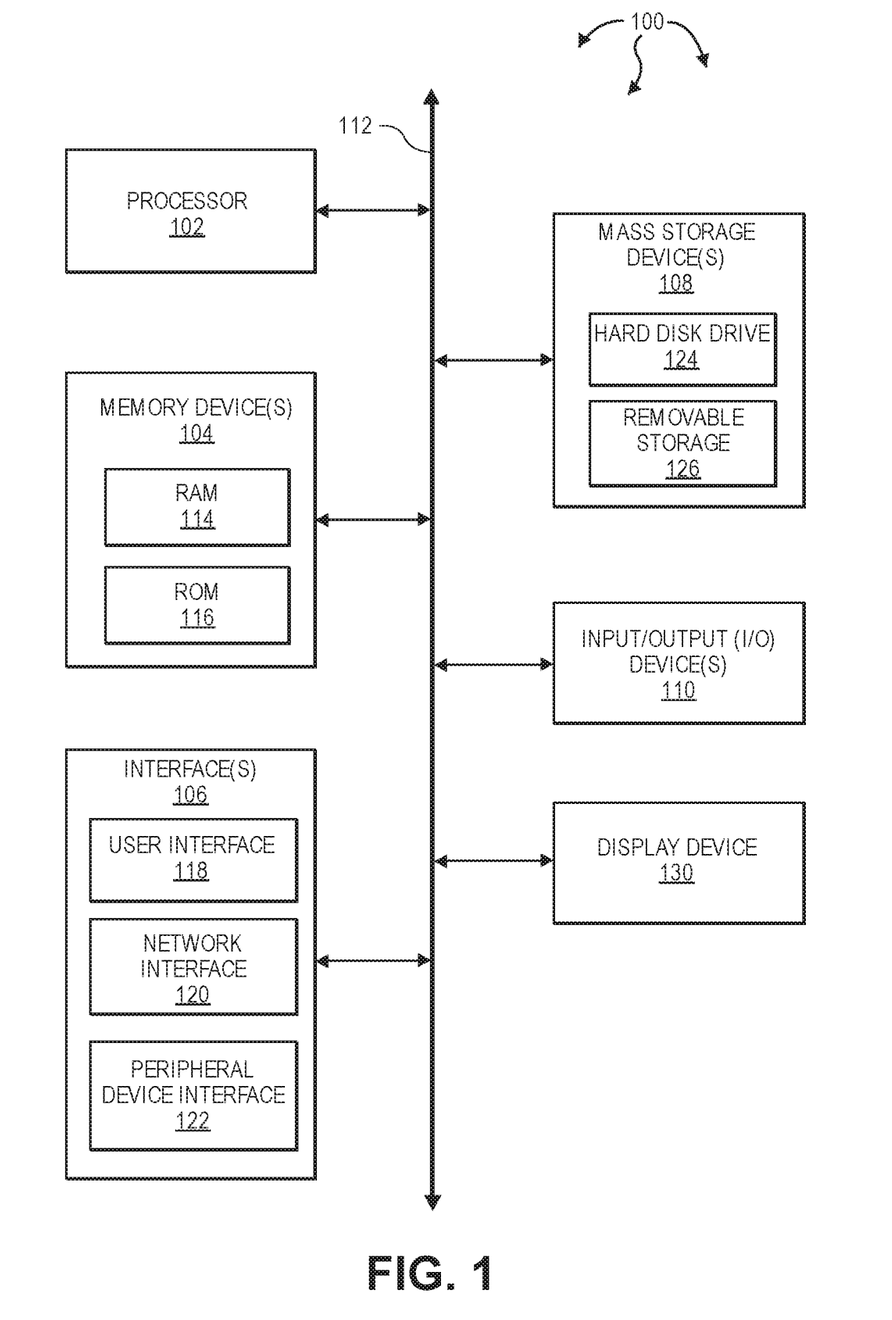
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device (s) 110 to communicate with one another, as well as other devices or components coupled to bus 112. Bus 112 represents one or more of several types of bus structures, such as a system bus, PCI bus, IEEE 1394 bus, USB bus, and so forth.

In this description and the following claims, a vehicle can be a land-based vehicle, a vehicle capable of flight, and/or a vehicle capable of water travel. In some aspects, a vehicle is capable of multiple modes of transportation, such as, for example, land-based travel and airborne travel or land-based travel and water-based travel. Land-based vehicles can include a car, a van, a truck, a motorcycle, a bus, etc. A vehicle can include various components, such as, for example, tires, wheels, brakes, throttle, engines, steering wheels, wings, rotors, rudders, etc., to facilitate operation on roadways, waterways, or in the air. A vehicle can be autonomous and/or human operated.

Figure 2:
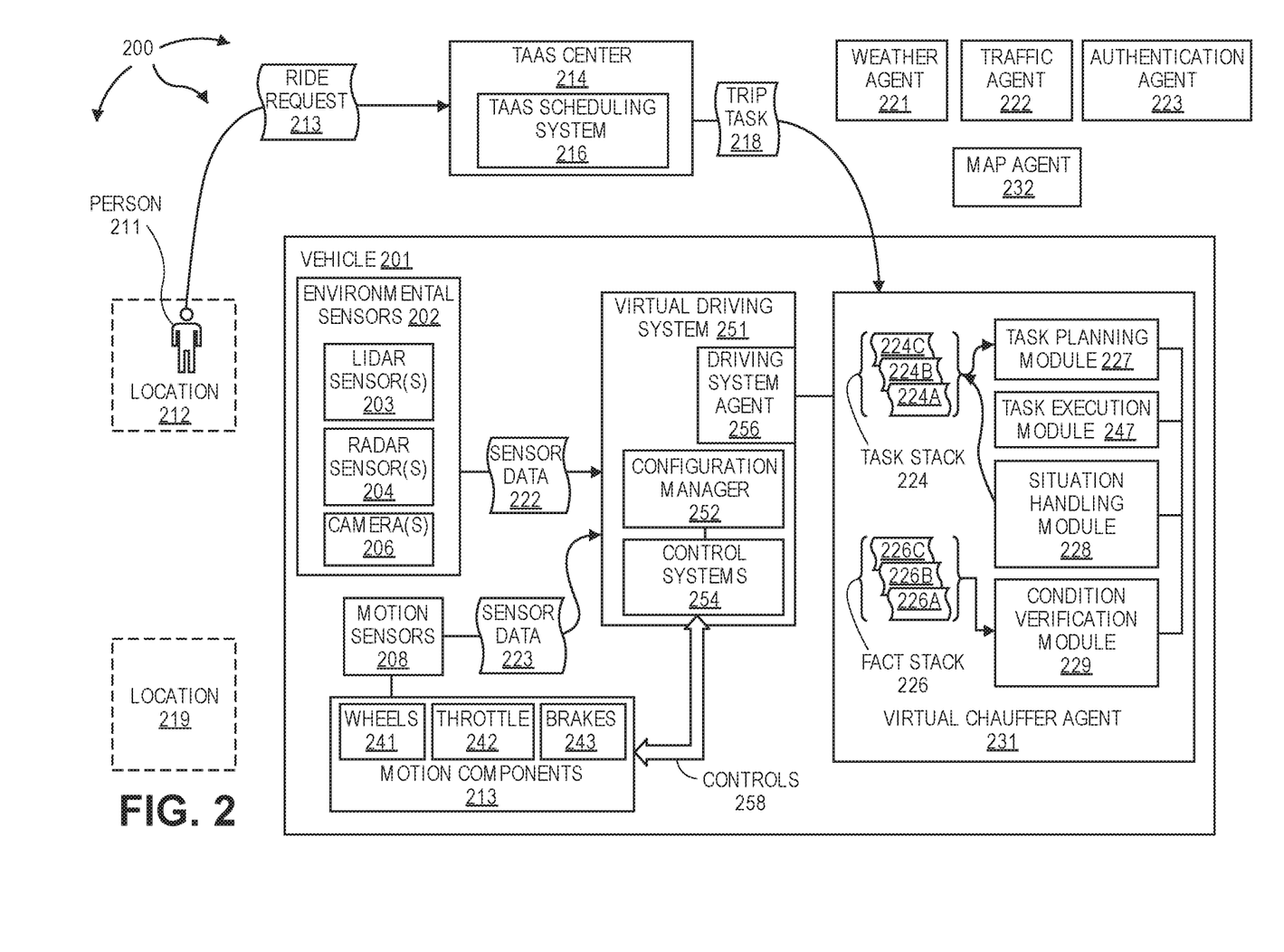
FIG. 2 illustrates an example computer architecture that facilitates handling rider service at an autonomous vehicle.

FIG. 2 illustrates an example autonomous vehicle 201 in environment 200. Environment 200 includes Transportation as a Service (TaaS) center 214, weather agent 221, traffic agent 222, authentication agent 223, map agent 223, and person 211. Vehicle 201 can be an autonomous ground based vehicle and can include any of the components described with respect to computing device 100. Vehicle 201 can carry cargo and/or passengers.

Environment 200 may be and/or include interconnected portions of: a roadway, an intersection, a parking lot, a bike path, a trail, a pedestrian walkway, a cross walk, a sidewalk, a hallway, a corridor, etc. Vehicle 201 can move within environment 200 to navigate from a current location to a first location 212 and from the first location 212 to a second location 219.

As depicted in FIG. 2, vehicle 201 includes environmental sensors 202, motion sensors 208, motion components 213, virtual driving system 251, and virtual chauffer agent 231. Some or all of environmental sensors 202, motion sensors 208, motion components 213, virtual driving system 251, and virtual chauffer agent 231, as well as their respective components can be connected to one another over (or be part of) a network, such as, for example, a PAN, a LAN, a WAN, a controller area network (CAN) bus, and even the Internet. Accordingly, each of environmental sensors 202, motion sensors 208, motion components 213, virtual driving system 251, and virtual chauffer agent 231, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Environmental sensors 202 further include camera(s) 206, LIDAR sensor(s) 203, and Radar sensor(s) 204. Camera(s) 206, LIDAR sensor(s) 203, and Radar sensor(s) 204 can capture images of and/or sense other objects in environment 200. Environmental sensors 202 can capture images in different portions of the light spectrum including the visible light spectrum and the InfraRed (IR) spectrum.

Environmental sensors 202 can be configured to sense objects 360 degrees around vehicle 201. Environmental sensors 202 can be configured to face in different directions, such as, for example, in a direction of travel (e.g., front), away from a direction of travel (e.g., rear), and essentially perpendicular to a direction of travel (e.g., each side), to provide 360-degree coverage. In some aspects, a sensor changes orientation based on movement of vehicle 201. For example, if vehicle 201 reverses direction, a front facing sensor can become a rear facing sensor and vice versa. If vehicle 201 turns, a side facing sensor can become a front facing or rear facing sensor. The number and configuration of sensors environmental 202 can be based on sensing ranges and angles of individual sensors as well as a desired precision of navigation (e.g., within environment 200).

Accordingly, environmental sensors 202 can capture sensor data, for example, sensor data 222, for part of environment 200 by sensing the part of environment 200 (e.g., out to the sensor range of sensors 202). Environmental sensors 202 can send captured sensor data, for example, sensor data 222, to virtual driving system 251.

Configuration of motion components 213 defines the motion of vehicle 201, including direction, speed, and acceleration/deceleration. As depicted, motion components 213 include wheels 241, throttle 242, or brakes 243. The configuration (angle) of wheels 241 can be changed to define vehicle 201's direction of travel. The configuration of throttle 242 and brakes 243 can be changed to define vehicle 201's speed and acceleration/deceleration.

Motion sensors 208 can monitor motion components 213 during operation of vehicle 201. Motion sensors 208 can capture sensor data, for example, sensor data 223, from monitoring motion components 213. Motion sensors 208 can send captured sensor data, for example, sensor data 223, to virtual driving system 251. Motion sensors 208 can include inertial sensors, wheel speed sensors, suspension height sensors, steering wheel angle sensors, steering torque sensors, and brake pressure sensors.

Generally, virtual driving system 251 is configured to control (e.g., set, transition, etc.) the configuration of motion components 213. As depicted, virtual driving system 251 includes configuration manager 252, control systems 254, and driving system agent 256. Virtual driving system 251 may also include an environment sensing agent and/or an interior sensing agent, or other suitable agents. The environment sensing agent can interact with environmental sensors 202. The interior sensing agent can interact with motion sensors 208.

Configuration manager 252 can access sensor data from environmental sensors 202 (e.g., sensor data 222) and data from motion sensors 208 (e.g., sensor data 223). From the sensor data, configuration manager can determine configuration changes to safely operate vehicle 201, for example, on a roadway. Safe operation can include maintaining speed within posted speed limits, obeying traffic signs and signals, avoiding obstacles, etc. Configuration manager 252 can send configuration changes to control systems 254.

Control systems 254 can include an integrated set of control systems for fully autonomous movement of vehicle 201. For example, control systems 254 can include a throttle control system to control throttle 242, a steering system to control wheels 241, a collision avoidance system to control brakes 243, etc. Control systems 254 can receive input from other components of vehicle 201 (including configuration changes from configuration manager 252). Based on received input, control systems 254 can send automated controls 258 to motion components 213 to control movement of vehicle 201. For example, control systems 254 can send automated controls 258 to cause vehicle 201 to brake, slow down, accelerate, turn, etc., in order to maintain safe roadway operation.

Generally, virtual chauffer agent 231 is configured to perform a trip task 218, which is transport a rider from one location to another location. Transporting a rider from one location to another can include a number of subtasks, such as, onboarding a rider, transporting a rider, and offboarding a rider. Each of onboarding, transporting, and offboarding can include further subtasks, such as, authenticate a rider, load luggage, etc.

As depicted, virtual chauffer agent 231 includes task planning module 227, task execution module 247, situation handling module 228, condition verification module 229, task stack 224, and fact stack 226. Task stack 224 includes a list of tasks to be performed by virtual chauffer agent 231. Task planning module 227 can manage task stacks, including pulling tasks from task stack 224 for execution. Task execution module 247 can execute tasks. If there is an anomaly or exception to task execution, situation handing module 228 is invoked. Situation handling module 228 includes rules for responding to different situations. A response to an anomaly or exception can include taking actions or creating new tasks on task stack 224.

Fact stack 226 includes a set of facts known by virtual chauffer agent 231. Condition verification module 229 can determine whether task conditions are met and/or satisfied. Condition verification module 229 includes rules for responding to situations when conditions are not met. When condition verification module 229 verifies a condition is met, condition verification module 229 returns a "yes" (or true). When condition verification module 229 determines a condition is not met, condition verification module 229 may trigger the situation handling module 228 to take additional actions or create new tasks on the task stack 224.

Virtual chauffer agent 231 can include a default/fallback position to contact a human when it cannot understand or process a problem.

Virtual chauffer agent 231 can send commands to driving system agent 256. Commands can instruct virtual driving system 251 to take various actions defined in a task, such as, for example, driving to a location, unlocking doors, opening the trunk, etc. Commands can also request information from virtual driving system 251, such as, for example, are the wipers on, are the head lights on, what speed is vehicle 201 traveling, etc. Virtual chauffer agent 231 can also communicate with an environment sensing agent and/or an interior sensing agent of virtual driving system 251 to access sensor data or reasoning based on sensor data (e.g., is vehicle parked in a puddle).

Environment 200 also includes weather agent 221, traffic agent 222, authentication agent 223, and map agent 232. Weather agent 221 is configured to provide weather data. Traffic agent 222 is configured to provide traffic data. Authentication agent 223 is configured to authenticate riders. Map agent 232 is configured to provide map information. Other agents and modules can communicate with the described agents to receive provided data.

Vehicle 201 can also include a communication module configured to communicate with other vehicles (e.g., vehicle-to-vehicle communication (V2V)) or other computer systems (e.g., vehicle-to-infrastructure communication (V2I)). Vehicle 201 can use the communication module to communicate with external systems including TaaS center 214, weather agent 221, traffic agent 222, authentication agent 223, and map agent 232.

A task is the format of information used for communication between agents. For example, virtual chauffeur agent 231 can send a task to weather agent 221 to request the weather. Similarly, virtual chauffeur agent 231 can send a task to driving system agent 256 to request vehicle 201 move to a location.

TaaS center 214 can receive ride requests from persons desiring to be transported between locations. A person can submit a ride request to TaaS center 214 through a website or mobile telephone application or can call TaaS center 214. In response to a ride request, TaaS scheduling system 216 can locate an available autonomous vehicle and generate a trip task for the autonomous vehicle. TaaS scheduling system 216 can send the trip task to virtual chauffer agent 231 for completion.

For example, person 211 can submit ride request 213 to TaaS center 214. Ride request 213 can request that person 211 be transported from location 212 to location 219. TaaS scheduling system 216 can determine that vehicle 201 is available. TaaS scheduling system 216 can generate trip task 218 and send trip task 218 to vehicle 201. Virtual chauffer agent 231 can receive trip task 218.

Figure 4:
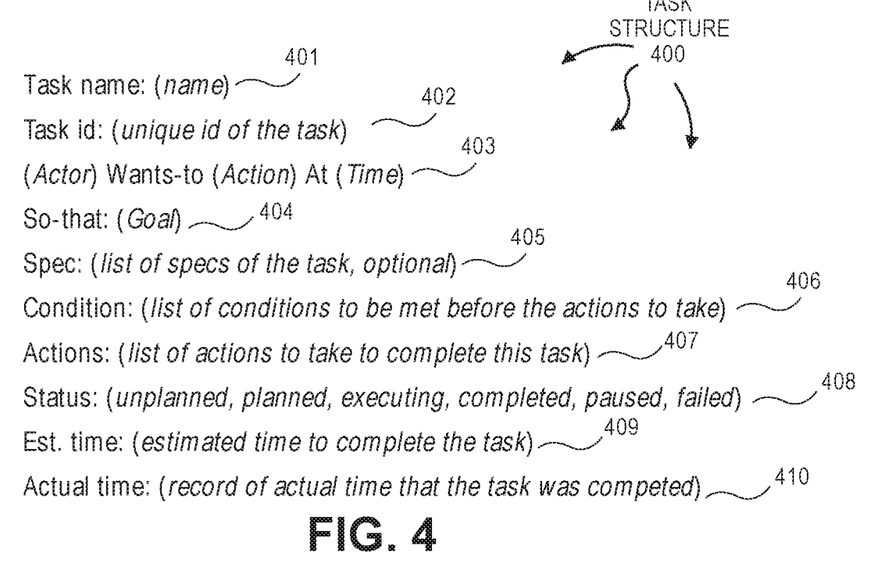
FIG. 4 illustrates an example task format.

FIG. 4 illustrates an example task structure 400. Line 401 indicates that a task can include a task name. Line 402 indicates that a task can include a unique task id. Line 403 indicates a task can define that an actor (e.g., a passenger) wants an action (e.g., to traveling from one location to another location) at a specified time. Line 404 defines a goal of line 403 (e.g., so that a passenger is transported from one location to another location). Line 405 defines an optional specification for the task. Line 406 defines conditions to be satisfied prior to performing actions in line 407. Line 407 defines a list of actions (some of which may be sub-tasks) to complete the task. Line 408 defines a task status, which may be one of: unplanned, planned, executing, completed, paused, failed, and/or other statuses. Line 409 defines an estimated time to complete the task. Line 410 defines the actual time taken to complete the task.

Thus, completing trip task 218 (i.e., giving person 211 a ride from location 212 to location 219) can include performing one or more subtasks. For example, trip task 218 can include an authentication task, a drive to location 212 task, an onboard person 211 task, a drive to location 219 task, and an offboard person 211 task. Completing each of authentication, pick up, onboard, drop off, and offboard can also include performing one or more subtasks. For example, onboarding can include loading person 211 and loading cargo (e.g., person 211's luggage).

Initially, trip task 218 can be included in task stack 224. As task planning module 227 processes tasks from stack 224, corresponding subtasks (e.g., tasks 224A, 224B, 224C, etc.) can be created on task stack 224. If any exceptions or anomalies occur, situation handling module 228 can create additional tasks on task stack 224 to address the exceptions or anomalies. In some aspects, situation handling module 228 prioritizes tasks so that tasks for handling exceptions or anomalies (which may be more important to rider service) are given priority over other tasks. When a task is completed, the task can be removed from task stack 224.

When a task is considered for processing, condition verification module 229 can check fact stack 226 to determine if conditions for the task are satisfied. When conditions are satisfied, task execution module 247 is permitted to process the task. When conditions are not satisfied, task execution module 247 is prevented from processing the task. For example, prior to processing a task to move to location 212, condition verification module 229 can verify that passenger 211 is authenticated. If passenger 211 is authenticated, the task to move to location 212 can be processed. If passenger 211 is not authenticated, the task to move to location 212 is prevented from being processed.

Thus, during performance of activities triggered by trip task 218, tasks in task stack 224 and facts in the fact stack 226 can change and be applied dynamically based on a trip progress, actions of person 211, weather, traffic, addressing exceptions/anomalies, etc.

Figure 3:
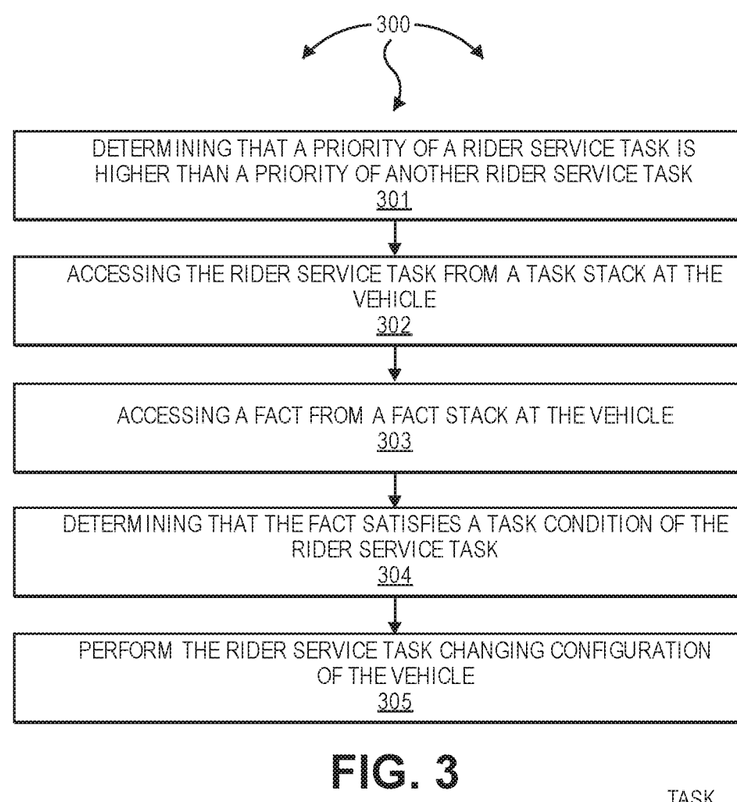
FIG. 3 illustrates a flow chart of an example method for handling rider service at an autonomous vehicle.

FIG. 3 illustrates a flow chart of an example method 300 for handling rider service at an autonomous vehicle. Method 300 will be described with respect to the components and data in computer architecture 200.

Method 300 includes determining that a priority of a rider service task is higher than a priority of another rider service task (301). For example, task planning module 227 can determine that task 224A has a higher priority than task 224B. Method 300 includes accessing the rider service task from a task stack at the vehicle (302). For example, task planning module 227 can access or determine task 224A from task stack 224.

Method 400 includes accessing or determining a fact from a fact stack at the vehicle (303). For example, condition verification module 229 can access fact 226A from fact stack 226. Method 400 includes determining that the fact satisfies a task condition of the rider service task (304). For example, condition verification module 229 can determine that fact 226A satisfies a condition of task 224A. Method 400 includes performing the rider service task, which may include changing configuration of the vehicle (305). For example, virtual chauffeur agent 231 can instruct virtual driving system 251 (through driving system agent 256) to drive to location 212, pull up slightly to get out of a puddle, drive to a nearby covered location, etc. Other rider service tasks can include authenticating person 211, open a storage compartment of vehicle 201, unlocking a door of vehicle 201, etc.

Virtual chauffer agent 231 has a high level of autonomy and modularity. The virtual chauffer agent 231 can execute tasks in flexible orders and is not limited by reliance on a decision tree structure. Modeling is more modularized, dividing bigger problems into smaller modules. Smaller modules can be reused (tasks, actions, condition checks, etc. are reusable). Virtual chauffer agent 231 can also take advantage of existing services (weather, traffic conditions, gas stations, restaurants) and others.

Task structure 400 can support inference (reasoning). A Task may have a goal. When a condition is not met or an action fails, the goal cannot be reached or satisfied. Virtual chauffer agent 231 then tries to find another task that can repair or replace the failed action or explain the reason why the goal could not be reached. Task structure 400 enables using AI Planning techniques. Tasks have an actor, action, time, duration, conditions, actions (all the factors that support planning).

Task structure 400 also supports machine learning. Various machine learning techniques can be applied to improve system performance by learning from historical data. For example, when a specific Task takes longer time under certain weather condition, the system can learn this and assign a longer Estimated Time to the Task, so that virtual chauffer agent 231 can plan trips more accurately.

The agent architecture and task structure can make the system less dependent on hardware/software upgrades and modifications. Tasks can be represented using standardized tagged text (such as XML/RDF/OWL) and not compiled programs. Tasks can be viewed as knowledge. The knowledge sources (ontologies) can be modified without programming code changes. Tasks can be deployed as self-contained services with no requirement for costly software releases. In many cases, new tasks can be added dynamically. The more the system develops, the easier it is to add new tasks, since many elements of the tasks (condition checks, actions) have been developed and can be reused.

Virtual chauffer agent 231 can be tuned through simulation. Real world cases from the field operation can be captured using text (Tasks and Conditions). The real-world cases can be input into a simulation system easily to study the behavior of the system. Conditions and tasks an also be varied to simulate new cases to test and debug virtual chauffer agent 231.

Task planning module 227 can apply a variety of different tasks to provide rider service at vehicle 201. A task can be structured to include a variety of data elements, such as, for example, an actor, an action, a goal, a list of conditions to be met, a list of sub-tasks included in the task, a specification, one or more contexts under which the task is to be performed, a status, etc. Example tasks include:

Trip Task
Vehicle_A wants to send Passenger_A from location 1 to location 2
So that: Passenger A will be at location 2
Specs:
    Passenger: Passenger_A
    Origin location: location 1 (with GPS and detailed info)
    Destination location: location 2 (with GPS and detailed info)
    Expected pick up time: time 1
    Expected arrival time: time 2
    Expected wait time: x seconds
    Number of party: 1

Number of luggage: 1
Pay method: paid
Conditions:
1) Has pick up route
2) Has travel route
Action (sub-tasks):
1) Drive to location 1 (Pickup Task)
2) Onboard passenger_A
3) Drive to location 2 (Travel Task)
4) Offboard passenger_A
Status: Planned
Est Time: 20
Pickup Task
Vehicle_A wants to drive from current location to location 1
So that: Vehicle_A can pick up Passenger_A at (current time+Est time)
Specs:
    Passenger: Passenger_A
    Expected pick up time: time 1
    Origin location: location 1 (with GPS and detailed info)
    Destination location: location 2 (with GPS and detailed info)
    Expected pick up time: time 1
Conditions:
1) Vehicle_A is clean
2) Vehicle_A is ready to pick up passengers
3) Has pick up route
Action (sub-tasks):
1) Send VDS the trip
2) Inform TaaS Center that the vehicle has started the Pickup Trip
Status: Planned
Est Time: 3
Onboarding Task
Passenger_A wants to onboard vehicle_A
So that: passenger_A is in vehicle_A
Specs:
    Passenger: Passenger_A
    Origin location: location 1 (with GPS and detailed info)
    Expected pick up time: time 1
    Expected wait time: x seconds
    Number of party: 1
    Number of luggage: 1
    Pay method: paid
Conditions:
1) vehicle is at the pickup location
2) pickup location is available and accessible
Action:
1) notify passenger_A when vehicle is near location 1
2) get connection with passenger_A
3) authenticate passenger_A
4) allow passenger_A to authenticate the vehicle_A
5) let passenger_A to load a luggage (this sub task depends on if there is a luggage in the spec. If there is no luggage in the spec, this sub-task will not appear)
6) unlock the vehicle (open door) and greet passenger_A to hop in
7) ensure passenger_A is securely seated and the door is closed
8) confirm passenger_A the destination
9) wait for passenger_A to signal "go" command
Status: Planned
Est Time: 2
Travel Task
Vehicle_A wants to drive from location 1 to location 2
So that: passenger_A will be at location 2
Specs:
    Passenger: Passenger_A
    Expected arrival time: time 2
    Destination location: location 2 (with GPS and detailed info)
    Route: route info
Conditions:
1) Passenger_A is in vehicle
2) Has received "go" signal from Passenger_A
3) Has trip route
Action (sub-tasks):
1) Send VDS the trip
2) Inform TaaS Center that the vehicle_A is sending passenger_A to destination
Status: Planned
Est Time: 15
Offboarding Task
Passenger_A wants to offboard
So that: passenger_A will be at location_2
Specs:
    Passenger: Passenger_A
    Destination location: location 2 (with GPS and detailed info)
    Expected arrival time: time 2
    Number of luggage: 1
Constraint:
1) the vehicle is at location_2
2) the vehicle is able to drop off passengers at this location
Action:
1) Inform passenger_A destination has arrived.
2) remind passenger_A pickup luggage
3) remind passenger_A to check for personal belongings
4) open the door for passenger_A
5) open the trunk for passenger_A
6) verify the offboard checklist
7) inform TaaS Center that trip-A has concluded
Status: Planned In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, tasks, facts, ride requests, trip tasks, exceptions, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, tasks, facts, ride requests, trip tasks, exceptions, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed is:

1. A method performed by an autonomous vehicle, the method comprising:
   receiving a request for a rider service associated with the autonomous vehicle;

creating a first rider service task for fulfilling the rider service, the first rider service task comprising one or more conditions required to complete the first rider service task;
storing the first rider service task in a task stack of the autonomous vehicle;
determining that an exception exists in completing the first rider service task;
creating, based on the determination that the exception exists, a second rider service task for remedying the exception;
storing the rider service second task in the task stack of the autonomous vehicle, wherein the second rider service task is associated with a higher priority level in the task stack than the first rider service task based on the second rider service task being associated with remedying the exception;
performing the second rider service task, the second rider service task comprising:
referencing a prior rider service exception similar to the determined exception;
and determining a remedying action taken with respect to the prior rider service exception; and
completing, based on the remedying action taken with respect to the prior rider service exception, the first rider service task for fulfilling the rider service.

2. The method of claim 1, wherein the first rider service task from the task stack comprises one or more sub-tasks.

3. The method of claim 2, further comprising receiving the request for the rider service from a Transportation as a Service (TaaS) scheduling system.

4. The method of claim 3, wherein receiving the request for the rider service from the TaaS scheduling system comprises receiving a task to drive to a first location, onboard a passenger at the first location, drive from the first location to a second location, and offboard the passenger at the second location.

5. The method of claim 1, wherein the first rider service task further includes an actor, an action, and a time.

6. The method of claim 1, further comprising receiving a fact from an agent, the agent selected from among: a driving system agent, a weather agent, a map agent, a traffic agent, a sensor agent, or an authentication agent.

7. The method of claim 1, wherein the first rider service task further comprises at least one of: an actor, an action, a goal, a list of conditions to be met, or a list of sub-tasks included in the task.

8. The method of claim 7, wherein the first rider service task comprises one or more contexts under which the first rider service task is to be performed and a status.

9. The method of claim 7, wherein each sub-task in the list of sub-tasks is structured to contain an actor, an action, a goal, or a list of conditions to be satisfied.

10. An autonomous vehicle comprising:
one or more sensors;
memory storing computer-executable instructions; and
one or more processors coupled to the memory and configured to execute the computer-executable instructions to:
receive a request for a rider service associated with the autonomous vehicle;
create a first rider service task for fulfilling the rider service, the first rider service task comprising one or more conditions required to complete the first task;
store the first rider service task in a task stack of the autonomous vehicle;
determine that an exception exists in completing the first rider service task;
create, based on the determination that the exception exists, a second rider service task for remedying the exception;
store the second rider service task in the task stack of the autonomous vehicle, wherein the second rider service task is associated with a higher priority level in the task stack than the first rider service task based on the second rider service task being associated with remedying the exception;
perform the second rider service task, the second rider service task comprising:
reference a prior rider service exception similar to the determined exception; and
determine a remedying action taken with respect to the prior rider service exception; and
complete, based on the remedying action taken with respect to the prior rider service exception, the first rider service task for fulfilling the rider service.

11. The autonomous vehicle of claim 10, wherein the first rider service task is a sub-task of a third rider service task.

12. The autonomous vehicle of claim 10, wherein the first rider service task indicates an actor, an action and a time.

13. The autonomous vehicle of claim 10, wherein the one or more processors are further configured to execute the computer-executable instructions to:
Receive a fact from an agent, the agent including: a driving system agent, a weather agent, a map agent, a traffic agent, a sensor agent, or an authentication agent.

14. The autonomous vehicle of claim 10, wherein the one or more processors are configured to perform the first rider service task by changing the configuration of the autonomous vehicle by driving the autonomous vehicle to a location.

15. The autonomous vehicle of claim 10, wherein the one or more processors are configured to perform the first rider service task by changing the configuration of the autonomous vehicle by opening a storage compartment at the autonomous vehicle or unlocking a door of the autonomous vehicle.

16. A computer program product comprising one or more hardware storage devices having stored thereon computer-executable instructions that, when executed at a processor, cause the computer program product to perform the following:
receive a request for a rider service associated with an autonomous vehicle;
create a first rider service task for fulfilling the rider service, the first rider service task comprising one or more conditions required to complete the first task;
store the first rider service task in a task stack of the autonomous vehicle;
determine that an exception exists in completing the first rider service task;
create, based on the determination that the exception exists, a second rider service task for remedying the exception;
store the second rider service task in the task stack of the autonomous vehicle, wherein the second rider service task is associated with a higher priority level in the task stack than the first rider service task based on the second rider service task being associated with remedying the exception;
perform the second rider service task, the second rider service task comprising:

reference a prior rider service exception similar to the determined exception; and determine a remedying action taken with respect to the prior rider service exception; and complete, based on the remedying action taken with respect to the prior rider service exception, the first rider service task for fulfilling the rider service.

\* \* \* \* \*